(12) United States Patent
Bigolin

(10) Patent No.: US 7,572,498 B2
(45) Date of Patent: Aug. 11, 2009

(54) VISCOELASTIC SUPPORT STRUCTURE WITH IMPROVED ENERGY ABSORPTION PROPERTIES

(75) Inventor: Riccardo Bigolin, San Zenone degli Ezzelini (IT)

(73) Assignee: Selle Royal S.p.A. (IT)

( * ) Notice: Subject to any disclaimer, the term of this patent is extended or adjusted under 35 U.S.C. 154(b) by 0 days.

(21) Appl. No.: 10/574,520

(22) PCT Filed: Oct. 4, 2004

(86) PCT No.: PCT/IB2004/003224

§ 371 (c)(1),
(2), (4) Date: Jan. 23, 2007

(87) PCT Pub. No.: WO2005/032922

PCT Pub. Date: Apr. 14, 2005

(65) Prior Publication Data

US 2007/0141307 A1 Jun. 21, 2007

(30) Foreign Application Priority Data

Oct. 3, 2003 (IT) .......................... VI2003A0193

(51) Int. Cl.
| | |
|---|---|
| *B60N 2/38* | (2006.01) |
| *B62J 1/00* | (2006.01) |
| *B62J 1/18* | (2006.01) |
| *B32B 3/00* | (2006.01) |
| *B32B 1/04* | (2006.01) |
| *B32B 3/02* | (2006.01) |
| *B32B 3/12* | (2006.01) |
| *B32B 3/26* | (2006.01) |
| *B32B 3/28* | (2006.01) |
| *B32B 3/30* | (2006.01) |

(52) U.S. Cl. .......................... 428/156; 428/71; 428/76; 428/158; 428/167; 297/195.1; 297/214

(58) Field of Classification Search ................. 428/156, 428/172, 166, 167, 68, 70, 71, 76, 75, 158; 5/909, 654, 655.5; 297/195.1, 214, 199, 297/219.11, 202, 200, 452.41
See application file for complete search history.

(56) References Cited

U.S. PATENT DOCUMENTS

| | | | | | |
|---|---|---|---|---|---|
| 3,549,441 | A | * | 12/1970 | Mesinger et al. | ............... 156/79 |
| 4,451,083 | A | * | 5/1984 | Marchello | ............... 297/219.11 |
| 5,165,752 | A | * | 11/1992 | Terry | |
| 5,330,249 | A | * | 7/1994 | Weber et al. | |
| 5,356,205 | A | * | 10/1994 | Calvert et al. | |
| 5,397,162 | A | * | 3/1995 | Huang | |
| 5,441,676 | A | * | 8/1995 | Bigolin | |
| 5,670,232 | A | * | 9/1997 | Bigolin | |

(Continued)

FOREIGN PATENT DOCUMENTS

WO        WO-98/29010 A1 *  7/1998

*Primary Examiner*—Jennifer McNeil
*Assistant Examiner*—Catherine Simone
(74) *Attorney, Agent, or Firm*—Keusey, Tutunjian & Bitetto, P.C.

(57) ABSTRACT

The present invention provides a viscoelastic support structure having improved energy absorption properties. The support structure generally comprises a frame, at least one resilient filler layer, a flexible covering, and at least one gel insert interposed between the covering and the frame. The support structure finds particular use in vehicles, such as bicycles and motorcycles.

29 Claims, 1 Drawing Sheet

U.S. PATENT DOCUMENTS

| | | | | |
|---|---|---|---|---|
| 6,066,277 A | * | 5/2000 | Lee | |
| 6,074,001 A | * | 6/2000 | Yates | ...................... 297/195.1 |
| 6,131,994 A | * | 10/2000 | Yates | |
| 6,136,426 A | * | 10/2000 | Bigolin | |
| 6,290,794 B1 | * | 9/2001 | Yates | |
| 6,450,572 B1 | * | 9/2002 | Kuipers | |
| 6,739,656 B2 | * | 5/2004 | Yu | ........................ 297/215.16 |

* cited by examiner

VISCOELASTIC SUPPORT STRUCTURE WITH IMPROVED ENERGY ABSORPTION PROPERTIES

CROSS-REFERENCE TO RELATED APPLICATIONS

This application claims the benefit of International Patent Application No. PCT/IB2004/003224, filed Oct. 4, 2004, which claims the benefit of Italian Patent Application No. VI2003A000193, filed Oct. 3, 2003, both of which are incorporated by reference herein in their entirety.

1. Field of the Invention

The present invention is generally applicable to the field of human body supports and particularly relates to a viscoelastic support structure having improved energy absorption properties.

The support structure according to the invention may be advantageously used as a component for the construction of vehicles, such as bicycles and motorcycles, but for pieces of furniture as well, such as seats for chairs, stools and the like.

2. Background Art

A number of saddles for bicycles or similar vehicles are known, which have at least one portion made of gel. This latter material has high damping properties, which are particularly useful to attenuate the stresses transmitted by the vehicle to the user.

Particularly, certain embodiments, like the one described in U.S. Pat. No. 5,330,249, have an essentially rigid and continuous support structure, a gel filler portion being placed thereon. Such portion has a stress-strain curve with a hysteresis loop whereby the gel portion dissipates energy and provides comfort to the user.

Further, the contact surface between the support structure and the gel is generally flat or has a relatively small curvature.

An apparent drawback of these arrangements consists in that there are relatively few gel deformation possibilities and, as a result, little energy may be dissipated. In fact, the stresses generated in the gel by the user's weight turn into tangential forces at the contact surface. These tangential forces are opposed by friction or by the adhesion forces between the gel and the support, which dramatically limit gel deformation parallel to the contact surface.

EP-A-0903321 and U.S. Pat. No. 6,450,572 disclose respective embodiments in which a foam layer is interposed between the gel filler portion and the essentially rigid support structure.

This arrangement does not obviate the apparent drawback of the previous embodiment. Here the deformation of the gel parallel to the surface in contact with the foam material is limited by the elastic forces within the latter.

U.S. Pat. Nos. 6,066,277 and 6,290,794 disclose two methods for making a saddle comprising an essentially rigid support and at least one soft portion made of gel or another appropriately soft and easily deformable compound. Particularly, the rigid support has one or more through openings adapted to allow the soft portion to partly come out due to the rider's weight.

This arrangement has the drawback that, when repeatedly using the saddle, the soft portion may easily collapse, whereby the comfort features of the saddle are lost. Particularly, the soft portion is not supported at the through openings of the support and may progressively collapse under the user's weight. This reduces the extension of the stress responsive areas of the saddle, acted upon by the rider's weight, and causes an increase of the average pressure to be withstood by the user.

Certain embodiments of bicycle saddles have one or more through holes or openings which may have the aesthetic purpose of permitting the passage of light through the saddle and/or an aeration purpose. A first drawback of these arrangements consists in a reduced contact area between the saddle and the user, which generates relatively high reaction pressures. A second drawback of this arrangement consists in that the wheels, and particularly the rear wheel, may collect dust and other dirt from the road and project it onto the rider's clothes through the openings.

U.S. Pat. No. 5,397,162 discloses a bicycle saddle having a body made of a composite material, a soft upper covering and a flexible decorative layer interposed therebetween. The upper covering is made of a transparent material to make the underlying decorative layer visible. While this arrangement uses a transparent portion, due to the optical properties of the body and the decorative layer, it does not allow to obtain the particular aesthetic effect of allowing to look through the saddle.

SUMMARY OF THE INVENTION

A primary object of this invention is to obviate the above drawbacks, while providing a cost-effective support structure.

A particular object is to provide a support structure which has high damping properties and is capable of considerably attenuating any stress transmitted to the user.

A further object of the invention is to provide a support structure that is particularly convenient and comfortable.

Another particular object is to provide a structure which has a particular aesthetic quality, thanks to the possibility of looking through the structure.

These objects, as well as other objects that will be more apparent hereafter, are achieved by providing a viscoelastic support structure having improved energy absorption properties, comprising a rigid or semirigid frame, at least one layer made of a resilient filler, a flexible covering having a surface of contact with the user, at least one gel insert interposed between the covering and the frame to interact therewith when the user exerts a stress thereon, characterized by providing, on the insert and/or the frame and/or the covering, a plurality of protuberances and recesses with respect to a midsurface adapted to facilitate the deformation of the insert, in a direction transverse to the stress direction and/or essentially parallel to the mid-surface, to increase the energy that the insert is able to dissipate.

Thanks to this particular arrangement, a support structure may be obtained that is capable to effectively damp the stresses transmitted to the user, while being particularly comfortable.

Preferably, at least a portion of the flexible covering, the gel material and the basic frame material are essentially optically transparent, to allow the passage of light through the covering, the insert and the frame. Thanks to this particular characteristic, a structure with a particular aesthetic quality may be obtained.

BRIEF DESCRIPTION OF THE DRAWINGS

Further features and advantages of the invention will be more apparent from the detailed description of a few preferred, non-exclusive embodiments of a support structure according to the invention, which are described as non-limiting examples with the assistance of the annexed drawings, in which.

DETAILED DESCRIPTION OF THE INVENTION

Figure 1:
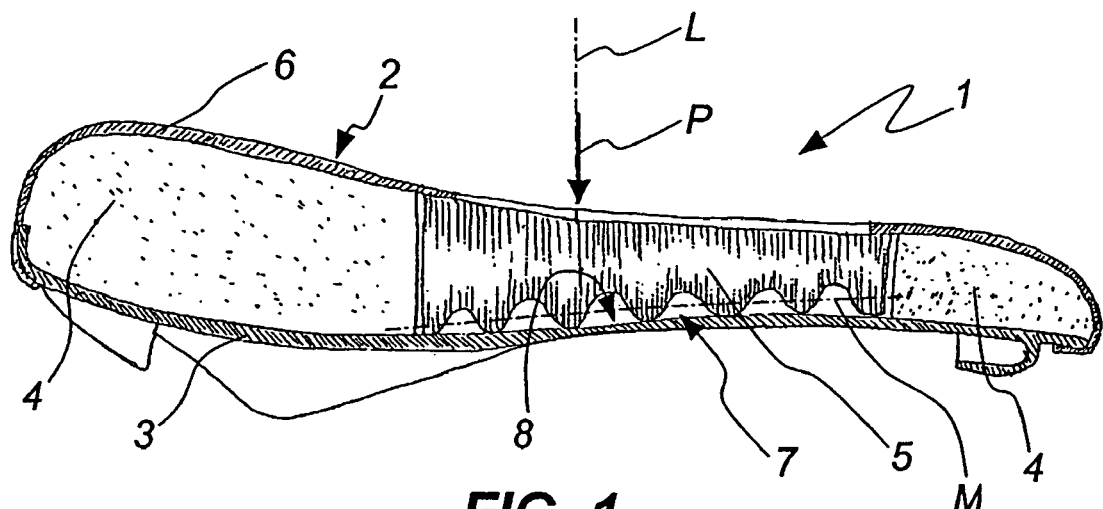
FIG. 1 is a sectional view of an embodiment according to the invention.
Figure 2:
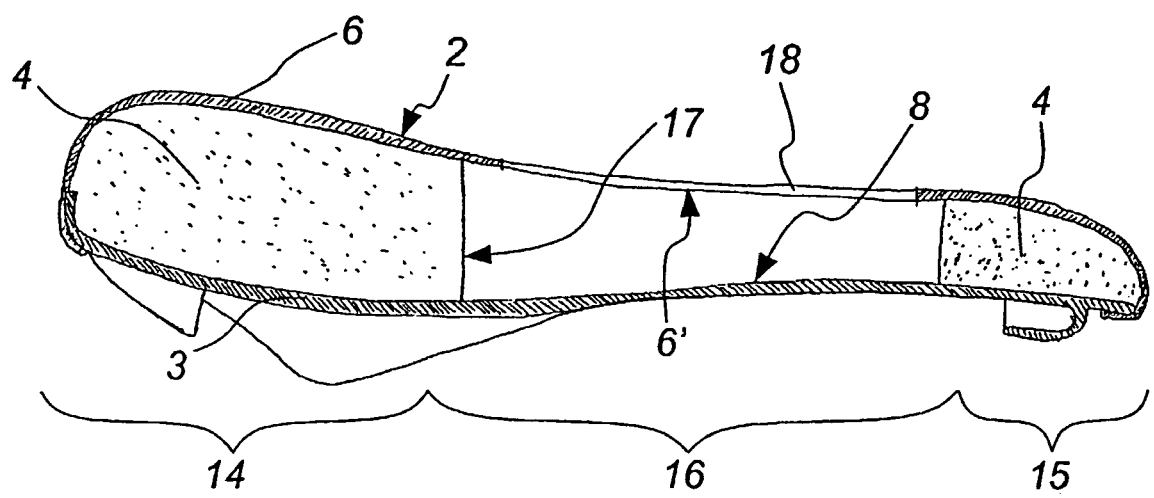
FIG. 2 is a view of a detail of FIG. 1.
Figure 3:
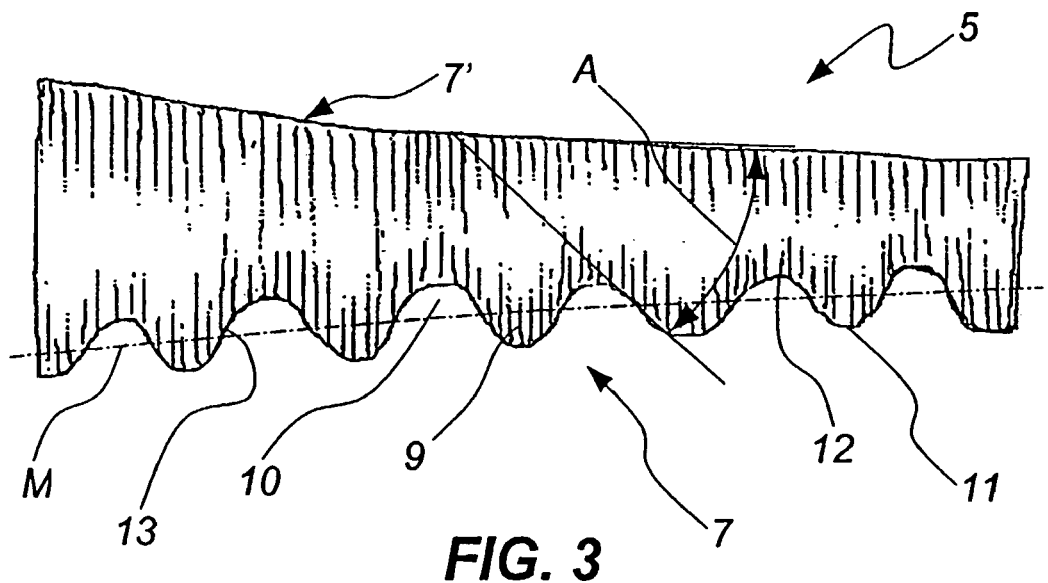
FIG. 3 is an enlarged view of a further detail of FIG. 1.

Particularly referring to the above figures, a viscoelastic support structure having improved energy absorption properties according to the invention is described, which is generally designated with numeral 1.

The structure 1 is designed to come in contact with a user and has a contact surface 2 on which the user will exert a stress P along an essentially transverse direction L.

The structure 1 has a rigid or semirigid frame 3 and at least one layer of a resilient filler 4, with at least one gel insert 5 located upon the frame 3. An upper covering 6 is further provided which defines the contact surface 2 and is adapted to cover the filler layer 4 and the insert 5.

Particularly, the insert 5 may have at least one surface 7 facing toward a top surface 8 of the frame 3 and at least one surface 7' facing toward a bottom surface 6' of the covering 6 to interact therewith as the user exerts a stress P thereon. Possibly, an intermediate filler layer, not shown, may be interposed between the insert S and the frame and/or the covering 6.

A peculiar feature of the invention is that the insert 5 and/or the frame 3 and/or the covering 6 have a plurality of protuberances 9 and recesses 10 with respect to a mid-surface M adapted to facilitate the deformation of the insert 5, in a direction transverse to the direction L of the stress P and/or essentially parallel to the mid-surface M.

In greater detail, the protuberances 9 and the recesses 10 with respect to the mid-surface M may be formed on at least one of the surfaces 7, 7' of the insert 5, as shown in FIG. 1.

In certain embodiments, not shown in the annexed drawings, the protuberances 9 and the recesses 10 with respect to the mid-surface M may be provided either on the top surface 8 of the frame 3 or on the bottom surface 6' of the flexible covering 6, or on both, providing in either case an increased deformation of the insert 5. In fact, the latter faces toward both the top surface 8 of the frame 3 and the bottom surface 6' of the covering 6.

The stress P exerted along the direction L results in a deformation of the insert 5 which has at least one component parallel and one component transverse to the direction L. The protuberances 9 and the recesses 10 allow both deformation components to develop freely, and particularly enhance the transverse deformation component. In fact, no mutual sliding between the insert 5 and the frame 3 is required for the latter component to develop, and no friction or adhesion forces between the insert 5 and the frame 3 shall be defeated. If the stress P is essentially orthogonal to the mid-surface M, the transverse component of the deformation may be essentially parallel to the mid-surface M.

As is shown, the protuberances 9 and the recesses 10 allow a greater deformation of the insert 5 and, as a result, a higher energy dissipation. In fact, the gel of the insert 5 may show hysteresis, and dissipate energy when it is under stress.

The protuberances 9 and the recesses 10 may be of various types and have different designs. Particularly, as shown in the annexed figures, the protuberances 9 may have top surfaces 11 mainly extending along respective first lines, and the recesses 10 may have bottom surfaces 12 mainly extending along respective second lines.

The first and second main extension lines may be either curved or essentially straight and essentially parallel.

Furthermore, the top surfaces 11 of the protuberances 9 and the bottom surfaces 12 of the recesses 10 may be connected together by inclined surfaces 13 having respective inclination angles A relative to the mid-surface M. In greater detail, the inclination angles A may be of 5° to 85° and preferably of about 45°.

As shown in FIG. 1, the resilient filler layer 4 may be interposed between the frame 3 and the flexible covering 6 and may include an enlarged rear portion 14 for supporting the buttocks of a user, a front horn portion 15 and a central portion 16. A through cavity 17, which is designed to receive the insert 5, may be formed on the central portion 16 or on the enlarged rear portion 14. In this case, the through cavity (not shown) may be placed at the ischial bones of the user.

Also, the insert 5 may extend from the top surface 8 of the frame 3 to the flexible covering 6.

Suitably, the gel material may be essentially optically transparent, to permit the passage of light through it. Also, the flexible covering 6 may have at least one essentially optically transparent portion 18, placed upon the insert 5. The transparent portion 18 of the flexible covering 6 may be integral with the remaining portion thereof, or form a separate portion connected to the remaining portion by appropriate connection means (not shown).

Furthermore, the base material of the frame 3 may be polymeric and essentially optically transparent. Therefore, light may pass through the covering 6, the insert 5 and the frame 3, i.e. through the whole support structure 1.

In a further embodiment (not shown in the annexed drawings), the base material of the frame 3 may be a ligneous, metal or composite material. Here again, the passage of light through the whole support structure 1 may be assured by forming at least one through hole in the frame 3. This hole may be positioned at the insert 5, and may be covered with a polymeric, essentially optically transparent layer, to support the insert 5 and prevent the latter from being soiled with dust or dirt.

The above description clearly shows that the inventive structure fulfils the proposed objects and particularly the design of the gel insert and the frame allows to considerably reduce the stresses transmitted to the user, with a consequent comfort increase.

The structure of the invention is susceptible of a number of changes and variants, within the inventive concept disclosed in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention claimed is:

1. A viscoelastic support structure with improved energy absorption comprising a frame, a flexible covering having a contact surface for contact with a user, a layer of a resilient filler interposed between the frame and the covering, at least one gel insert interposed between said covering and said frame, and a plurality of protuberances or recesses on at least one of said insert and said frame, said protuberances or recesses being aligned with respect to a mid-surface line extending at least partially along the length of said structure, wherein said insert comprises a bottom surface facing toward said frame and said frame comprises a top surface facing toward said insert, said protuberances or recesses being formed on one of said bottom surface of said insert or said top surface of said frame such that the insert directly interacts with the frame.

2. A structure as claimed in claim 1, wherein said protuberances or recesses are provided on said bottom surface of said insert.

3. A structure as claimed in claim 1, wherein said protuberances or recesses are provided on said top surface of said frame.

4. A structure as claimed in claim 1, wherein said protuberances have top surfaces mainly extending along respective first lines.

5. A structure as claimed in claim 4, wherein said recesses have bottom surfaces mainly extending along respective second lines.

6. A structure as claimed in claim 5, wherein said first and second lines are curved.

7. A structure as claimed in claim 5, wherein said protuberances or recesses have inclined surfaces for connecting said top surfaces and said bottom surfaces, said inclined surfaces having inclination angles relative to said mid-surface line.

8. A structure as claimed in claim 7, wherein said inclination angles are from 5° to 85°.

9. A structure as claimed in claim 1, wherein said filler layer comprises an enlarged rear portion, a front horn portion, and a central portion, wherein at least one of said central portion and said rear portion comprise at least one through cavity.

10. A structure as claimed in claim 9, wherein said at least one through cavity is present in said rear portion and is positioned in an area generally corresponding to the ischial bones of the user.

11. A structure as claimed in claim 9, wherein said through cavity is present in at least one of said central portion and said rear portion, and said insert is received in said through cavity.

12. A structure as claimed in claim 11, wherein said insert extends from said frame to said flexible covering.

13. A structure as claimed in claim 1, wherein said gel insert comprises a gel material that is essentially optically transparent.

14. A structure as claimed in claim 1, wherein said flexible covering comprises at least one essentially optically transparent portion.

15. A structure as claimed in claim 14, wherein said transparent portion of said flexible covering is located above said insert.

16. A structure as claimed in claim 14, wherein said transparent portion of said covering comprises a portion separate from said covering, said portion being connected to the rest of said flexible covering by suitable connection means.

17. A structure as claimed in claim 14, wherein said transparent portion is integral with the rest of said flexible covering.

18. A structure as claimed in claim 1, wherein said frame comprises a polymeric base material, that is essentially optically transparent.

19. A structure as claimed in claim 18, wherein the base material comprises a ligneous, metal or composite material.

20. A structure as claimed in claim 1, wherein said insert deforms in a direction transverse to the direction of a stress applied to said insert.

21. A structure as claimed in claim 1, wherein said insert deforms in a direct essentially parallel to said mid-surface line.

22. A structure as claimed in claim 1, wherein said insert deforms in one or more directions thereby increasing energy dissipation by said insert.

23. A structure as claimed in claim 5, wherein said first and second lines are straight.

24. A structure as claimed in claim 7, wherein said inclination angles are about 45°.

25. A structure as claimed in claim 1, wherein said frame comprises at least one through hole covered by a polymeric layer that is essentially optically transparent.

26. A structure as claimed in claim 1, wherein said direct interaction between said insert and said frame comprises deformation of the insert, said deformation having at least one component parallel to the direction of applied stress and at least one component transverse to the direction of the applied stress.

27. A structure as claimed in claim 1, wherein the said layer of said resilient filler includes a rear portion, a central portion, and a front horn portion.

28. A structure as claimed in claim 27, further comprising a through cavity formed on said rear portion or said central portion.

29. A viscoelastic support structure with improved energy absorption comprising:
   a frame;
   a flexible covering having a contact surface for contact with a user;
   a layer of a resilient filler interposed between said frame and said covering and having a through cavity;
   at least one gel insert interposed between said covering and said frame in said through cavity of said resilient filler layer; and
   a plurality of protuberances or recesses on at least one of said insert and said frame, said protuberances or recesses being aligned with respect to a mid-surface line extending at least partially along the length of said structure, wherein said insert comprises a bottom surface facing toward said frame and said frame comprises a top surface facing toward said insert, said protuberances or recesses being formed on one of said bottom surface of said insert or said top surface of said frame such that the insert directly interacts with the frame.

\* \* \* \* \*